Figure 1:
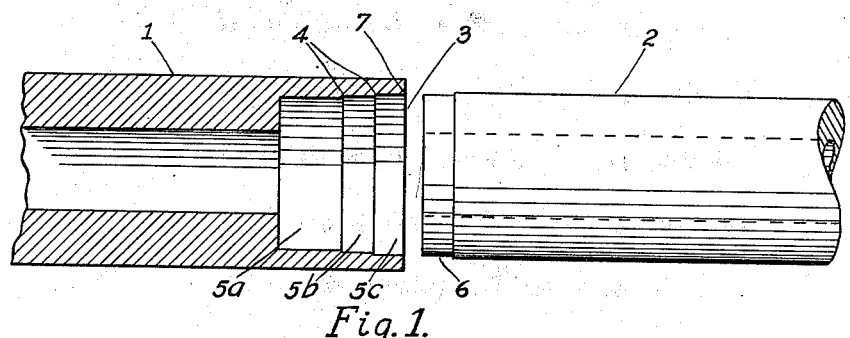

Sept. 23, 1930.  D. M. BOOTHMAN ET AL  1,776,615
JOINT AND METHOD OF MAKING THE SAME Filed Dec. 12, 1928

Witnesses
J. P. Deal.
C. G. Lloyd.

Inventors
Dale M. Boothman,
J. A. Cullerton

UNITED STATES PATENT OFFICE

DALE M. BOOTHMAN, OF OAKMONT, AND JAMES A. CULLERTON, OF NEW KENSINGTON, PENNSYLVANIA, ASSIGNORS TO ALUMINUM COMPANY OF AMERICA, OF PITTSBURGH, PENNSYLVANIA, A CORPORATION OF PENNSYLVANIA

JOINT AND METHOD OF MAKING THE SAME

Application filed December 12, 1928. Serial No. 325,443.

This invention relates to a method of forming joints between metallic articles of unequal hardness and has as the principal object the provision of a frictional joint which may be used as a substitute for welded, soldered or mechanical joints.

Metals, such as aluminum and steel, between which there exists a substantial difference in hardness may also offer a wide difference in melting temperatures and other physical characteristics which prevent the obtainment of a strong welded joint. The substantial difference in degree of hardness between the metals also renders the forming of mechanical joints between them difficult since the softer metal does not readily lend itself to attachment by the use of screw threads, couplings or similar well known joining means. The satisfactory joining of such metals is therefore a difficult problem, which is made still more so by the fact that even where ordinary soldering is resorted to, the joint is not strong and is readily corroded.

These difficulties have led us to devise the present invention which is based upon our discovery that a frictional joint may be formed between metals substantially varying in degree of hardness and that such a joint, when properly made, will for many purposes be much superior to the welded, soldered and mechanical joints heretofore used.

In the usual type of frictional or pressed joints between two metallic articles of substantially equal hardness the male member is made slightly larger than the smooth-walled female cavity and when inserted therein expands the cavity throughout its entire length thereby setting up a frictional resistance over the entire joining area. However, when a relatively soft metal forms one member of such a joint the softer metal flows under the pressure and this flow reduces to a large extent the gripping or frictional action.

According to the present invention this difficulty is overcome by forming in the hard metal a cavity having a step-like cavity surface, each step representing an abrupt decrease in the size of the cavity so that the cavity proper consists of a plurality of cavities each smaller in cross section than the one immediately preceding it. The male member is formed on the softer metal part and is of such shape that it may be forcibly inserted into the cavity but is neither so small as to fit loosely therein nor so large as to totally preclude forceful insertion. In forming the joint the male member is inserted in the upper part of the cavity and is thereafter forcibly inserted into the lower portions of the cavity.

Figure 2:
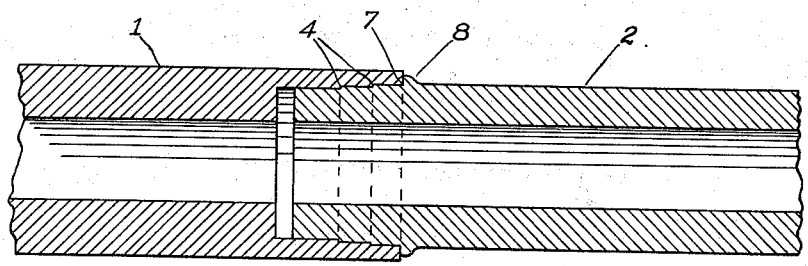
Figure 3:
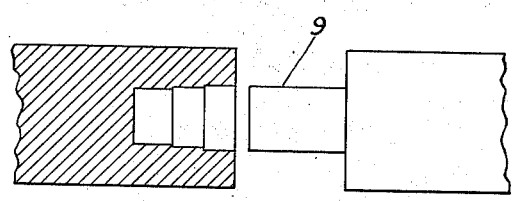

Referring to the accompanying drawings which illustrate the preferred forms of the invention, Fig. 1 is a longitudinal section showing two sections of tubing ready for joining; Fig. 2 is a longitudinal section through a joint formed of the elements shown in Fig. 1; Fig. 3 illustrates in longitudinal section two solid sections ready for joining.

The tube 1 is of a substantially harder metal than is the tube 2 and in its end the cavity 3 is formed. This cavity decreases in cross sectional area abruptly and discontinuously so as to form at determined intervals the steps 4 on the cavity walls thus producing in effect a cavity consisting of three counterbores represented by the concentric cylindrical sections $5^a$, $5^b$, and $5^c$. The tube 2 is, in this case, of such size as to allow its use as the male member without other alteration than the forming of the restricted portion 6 which corresponds in its preferred form, geometrically and dimensionally, to the opening of the cavity 3.

In forming the joint the restricted portion 6 of the tube 2 is inserted in the cavity 3 and coincides with that portion of the cavity represented by the cylindrical section $5^c$. Force is then applied and the tube 2 is forcibly inserted into the cavity to form the finished joint as shown in Fig. 2. During the insertion of the tube 2 the sharply projecting steps 4 and the edge of the cavity 7 shear the softer metal of the male member or tube and roll or turn back the excess metal so as to form a roll or ring of metal as shown at 8. A similar roll or ring of metal, although not shown, presumably occurs behind the steps 4 and in each case forms an area of highly compressive stress which exerts a strong frictional action on the tube 2 thus effectively holding it within the cavity. It is the presence and the action of these small steps on the cavity surface which enable the obtainment of a strong, sound joint. When such a joint as is shown in Fig. 2 is made between an aluminum member and a steel member, it has been found that these steps may be very small and generally need not exceed 0.001 to 0.003 of an inch in width.

As an example of the effectiveness of joints formed in accordance with our invention, a joint was formed between aluminum tubing and steel tubing following the procedure outlined above and shown in Figs. 2 and 3. The male member formed on the aluminum was 0.625 of an inch in diameter and, when the joint was completed, extended for a distance of 0.375 of an inch into the female cavity in the steel member, thus giving a contact surface between the male member and the walls of said cavity of approximately 0.7 of a square inch. When stressed in tension this joint withstood a force of 2700 pounds per square inch of contact surface without showing signs of any failure. Joints made in this manner and between tubing are very useful particularly where the tubing is of small diameter and must withstand a high internal pressure, as is illustrated by the above mentioned joint which was found capable of withstanding an internal pressure of 900 pounds without any failure occurring.

It will be apparent, however, that the method of joining which we have devised may be generally used with other metals than the ones mentioned and for other purposes than the joining of tubes. For instance, two solid bodies of metal between which it is necessary to establish connection may be joined as is indicated in Fig. 3. In this particular application of the invention, it is necessary to form a complete male member 9 on the softer of the two metals but in other respects the joint may be made in a manner similar to that illustrated in Figs. 1 and 2 and described in connection therewith.

In applying the principles of our invention to the different types of joints which may be made, it is necessary to determine by experiment the size of the cavity which is to be formed in the harder metal and the desirable magnitude of the small steps formed therein. Although the cavity has been described, in one form, as being cylindrical, it will be noted that other shapes may be used without destroying the effectiveness of the joint. In such cases it will be necessary that the male member correspond geometrically or approximately at least to the entire length of the cavity. While generally it will be desirable to use a cylindrical male member for insertion in a cylindrical cavity, it will be appreciated that a male member of many sided form, such as hexagonal, might readily serve the same purpose and that as long as the male member corresponds substantially in geometrical form to the cavity, the purposes of the invention will be served.

Also in order to provide a means whereby the members to be joined can be placed in alignment before force is applied, it is generally desirable that the end of the male member correspond both geometrically and dimensionally to the upper or largest portion of the cavity so that at the beginning of the joining operation the said end may be inserted without force into the said upper portion of the cavity. But this will not be necessary when means are at hand to hold the members to be joined firmly and in axial alignment while pressure is applied.

While we have described our invention in some detail, we do not, of course, limit ourselves to the exact construction or details shown and these may be varied without a departure from the principles and scope of the invention.

What we claim is:

1. The method of joining two metals of unequal hardness comprising forming in the hard metal a cavity having a step-like cavity surface, introducing into said cavity a male member formed of soft metal, and forming above each step in said step-like cavity surface an area of the said soft metal in a highly compressed condition.

2. In a joint between a relatively hard metal part and a relatively soft metal part the combination of a cavity of step-like cavity surface formed in the hard metal part, a male member formed on the soft metal part and frictionally engaged in said cavity, and areas of highly compressed soft metal formed by the shearing action of the steps in said step-like cavity surface and lying adjacent thereto.

3. In a joint between a steel part and an aluminum part the combination of a cavity of step-like cavity surface formed in the steel part, a male member formed on the aluminum part and frictionally engaged in said cavity, and areas of highly compressed aluminum formed by the shearing action of the steps in said step-like cavity surface and lying adjacent thereto.

DALE M. BOOTHMAN.
JAMES A. CULLERTON.